H. L. PALMER.

Improvement in Apparatus for the Manufacture of Paste-Board.

No. 5,471. Reissued July 1, 1873.

Witnesses.
A. Ruppert.
Edw. J. Bill

H. L. Palmer
Inventor.
D. P. Holloway & Co
Attys

THE ECKERT LITHOGRAPHING CO., WASHINGTON, D. C.

UNITED STATES PATENT OFFICE.

HENRY L. PALMER, OF STILLWATER, NEW YORK, ASSIGNOR TO EDWARD W. O'NEILL AND MAURICE FITZGIBBONS.

IMPROVEMENT IN APPARATUS FOR THE MANUFACTURE OF PASTEBOARD.

Specification forming part of Letters Patent No. 87,359, dated March 2, 1869; reissue No. 4,951, dated June 18, 1872; reissue No. 5,471, dated July 1, 1873; application filed December 20, 1872.

*To all whom it may concern:*

Be it known that HENRY L. PALMER, of Stillwater, in the county of Saratoga and State of New York, did invent a new and useful machine for attaching thin paper, textile fabrics, or other material to paper, pasteboard, and straw-board, of which the following is a specification:

The nature and object of the invention relate to an improvement in machinery for attaching thin paper, textile fabrics, or other material to paper, pasteboard, and straw-board, to be used in the manufacture of boxes, collars, and envelopes, or for any other purpose for which the material may be adapted. The object of the invention is to expedite the process of covering paper, pasteboard, and straw-board by machinery, by means of which thin paper or other material is pasted, attached, compressed, and dried by a single process, ready for use. The invention consists of a new and novel arrangement and combination of a paste-reservoir, paste-distributing-rollers, compressing-rollers, drying-cylinder, and calender-rollers, in connection or in combination with an endless apron, whereby thin paper or other material may be applied in sheets or in continuous sheets or rolls to paper, pasteboard, or straw-board, by applying a uniform film of paste, either upon the lower surface of the thin paper or upon the upper surface of the paste or straw board, and then compressing the same between two rollers, or a series of compressing-rollers, passing over a drying-cylinder, and finally between two or a series of calender-rollers.

Figure 1:
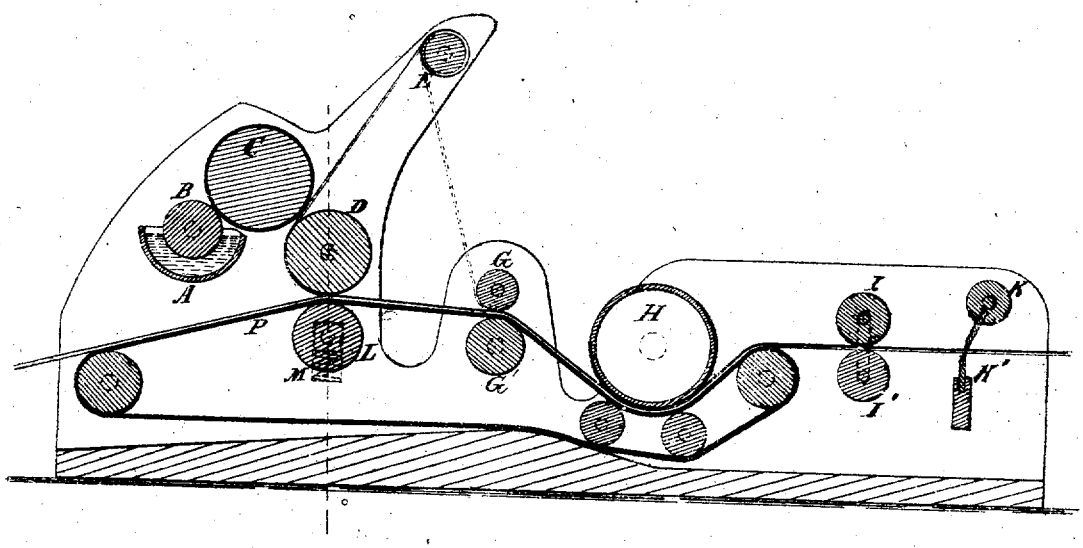
Figure 2:
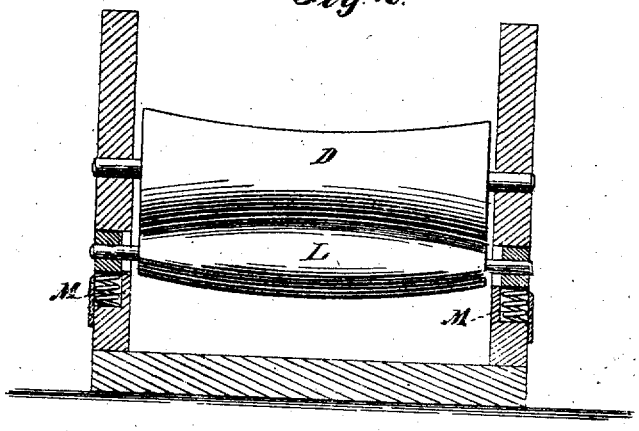

Figure 1 represents a transverse section of the machine embracing the invention. Fig. 2 represents an elevation of the fixed and adjustable rollers.

The frame of the machine is constructed of metal, of such form and design as may be best adapted to conform to the required arrangement of the several component parts. Motion is communicated to the operating-parts of the machine by means of a belt attached to the driving-wheel.

A is a paste-distributing reservoir, which may be supplied, by means of a pump, from a paste-receiving reservoir, resting upon the floor, and operated by the same power that drives the machine. B is a paste-roller covered with felt or other suitable material, the journals resting upon fixed bearings, the lower portion of the roller extending into the paste-reservoir so as to revolve in and distribute the paste. C is a roller, the journals resting upon movable or adjustable bearings, so arranged as to rest directly upon or against the paste-distributing roller B, from which motion is communicated by frictional contact, or motion may be communicated by ordinary gearing connected with the driving-wheel. D is a compressing-roller, the journals resting upon fixed bearings. L is an adjustable compressing-roller, resting upon adjustable bearings M, being arranged directly under roller L. G is likewise a compressing-roller, resting upon fixed bearings. G′ is likewise an adjustable compressing-roller, resting upon adjustable bearings, the upper or lower compressing-roller being made adjustable so as to conform to the different thicknesses of paste or straw board passed between them. H is a large hollow drying-cylinder, resting upon fixed bearings, heated by steam by means of a pipe connected with and passing through the journals into the cylinder. I and I′ are hollow calender-rollers, heated by steam in like manner. K and K′ are cutting-knives, arranged so as to cut continuous pieces of paper into sheets of any desirable size as it passes through the machine. E is a paper-roll, having a shaft passing through the center, the ends or journals resting upon fixed bearings, having an attachment for regulating the tension of the thin paper as it unwinds in the process of being united to the paste or straw board. P is an endless apron, passing over and around rollers at each end of the machine, between compressing-rollers D and L and G and G′, and under the drying-cylinder H.

The paste-roller B, roller C, and roller D may be constructed of different relative proportions as to their several diameters or circumferences. The roller D may be placed at any desirable distance from roller C for convenience of arrangement, and only used as a compressing-roller.

Having described the nature, object, and construction of the machine, it remains to describe its operation, so that it may be understood by those skilled in the art.

The motive power being applied to the operating-parts of the machine, the paste is pumped up from the receiving-reservoir to the distributing-reservoir A. The adjustable roller C being raised the thin paper is either passed between rollers B and C or between rollers C and D, under roller D, where it meets, and is united to the paste or straw board fed upon apron P, having received a coat or film of paste, either directly from paste-roller B or by the paste being transferred from roller B to roller C; thence between compressing-rollers D and L and compressing-rollers G and G′. The thin paper and paste or straw board, having been thus united and compressed, is carried upon the endless apron under and around the drying-cylinder H; from thence, in like manner, between the calender-rollers I and I′; and from thence between the cutting-knives K and K′. The paste or straw board may be lined in ordinary sheets, or in continuous sheets, when used as an attachment to the ordinary paper-making machine.

We claim as the invention of the said HENRY L. PALMER—

1. The combination of paste-reservoir A, paste-roller B, paste-distributing roller C, pressing-rollers D and L, with drying-cylinder H, substantially as and for the uses and purposes above described.

2. The combination of paste-reservoir A, paste-roller B, paste-distributing roller C, pressing-rollers D and L, drying-cylinder H, with cutting-knives K and K′, substantially as and for the uses and purposes above described.

EDWARD W. O'NEILL.
MAURICE FITZGIBBONS.

Witnesses:
WILLIAM C. HORNFAGER,
WM. G. HENDERSON.